United States Patent
Tian et al.

(10) Patent No.: US 10,434,721 B2
(45) Date of Patent: Oct. 8, 2019

(54) APPARATUS AND AN ASSEMBLY TO APPLY A FOAM SEAL TO A PART

(71) Applicant: Ford Global Technologies, LLC, Dearborn, MI (US)

(72) Inventors: Evan Tian, Nanjing (CN); Vincent Yin, Nanjing (CN); Denis Gerard O'Shannessy, Melbourne (AU); Ryan Lin, Nanjing (CN)

(73) Assignee: Ford Global Technologies LLC, Dearborn, MI (US)

( * ) Notice: Subject to any disclaimer, the term of this patent is extended or adjusted under 35 U.S.C. 154(b) by 274 days.

(21) Appl. No.: 15/649,467

(22) Filed: Jul. 13, 2017

(65) Prior Publication Data

US 2018/0022037 A1 Jan. 25, 2018

(30) Foreign Application Priority Data

Jul. 22, 2016 (CN) .......................... 2016 1 0584095

(51) Int. Cl.
  *B29C 53/56* (2006.01)
  *B29C 63/06* (2006.01)
  (Continued)

(52) U.S. Cl.
  CPC .......... *B29C 65/4805* (2013.01); *B29C 53/56* (2013.01); *B29C 63/0004* (2013.01);
  (Continued)

(58) Field of Classification Search
  CPC ....... B29C 53/36; B29C 53/56; B29C 53/562; B29C 53/8008; B29C 63/0004;
  (Continued)

(56) References Cited

U.S. PATENT DOCUMENTS 2,646,378 A * 7/1953 Morin ................. B29C 37/0082
  156/215
5,693,174 A * 12/1997 Nakata ............... B29D 99/0053
  156/361
(Continued)

FOREIGN PATENT DOCUMENTS

CN 2296837 11/1998
CN 2296837 Y * 11/1998
GB 2201473 A * 9/1988 ......... B60H 1/00507

*Primary Examiner* — Michael A Tolin
(74) *Attorney, Agent, or Firm* — Raymond L. Coppiellie; Kolitch Romano LLP (57) ABSTRACT

An apparatus to apply a foam seal to a part is provided. The apparatus comprises a receiving device to secure the part, a loading device and a driving device to drive the loading device. The receiving device includes a housing, a first rod coupled to the housing and at least partially disposed in the housing and a resilient member connected between the housing and the first rod at a radial direction. The loading device includes an actuating member and a holding member to hold the foam seal. The driving device is configured to move the loading device between a loading position and an application position and further drive the actuating member and the holding member to rotate around an axis parallel to the first rod. The actuation member contacts the housing while rotating and the foam seal on the holding member contacts the part at the application position.

20 Claims, 8 Drawing Sheets

(51) Int. Cl.
    *B29C 65/78*     (2006.01)
    *B60H 1/00*     (2006.01)
    *B29C 65/48*     (2006.01)
    *B29C 65/50*     (2006.01)
    *B29C 65/52*     (2006.01)
    *B29C 65/80*     (2006.01)
    *B29C 65/00*     (2006.01)
    *B29C 63/00*     (2006.01)
    *B29C 63/02*     (2006.01)
    B29L 31/30     (2006.01)
    B29K 105/04     (2006.01)

(52) U.S. Cl.
    CPC ........ *B29C 63/0095* (2013.01); *B29C 63/024* (2013.01); *B29C 63/06* (2013.01); *B29C 65/48* (2013.01); *B29C 65/5092* (2013.01); *B29C 65/52* (2013.01); *B29C 65/7841* (2013.01); *B29C 65/7891* (2013.01); *B29C 65/7894* (2013.01); *B29C 65/80* (2013.01); *B29C 66/1122* (2013.01); *B29C 66/5326* (2013.01); *B29C 66/727* (2013.01); *B29C 66/8161* (2013.01); *B29C 66/8227* (2013.01); *B29C 66/83411* (2013.01); *B60H 1/00564* (2013.01); *B29C 66/534* (2013.01); *B29C 66/83413* (2013.01); *B29K 2105/04* (2013.01); *B29L 2031/30* (2013.01); *B60H 2001/00635* (2013.01)

(58) Field of Classification Search
    CPC ... B29C 63/024; B29C 63/06; B29C 65/5092; B29C 65/7841; B29C 65/7891; B29C 66/5326; B29C 66/534; B29C 66/5346; B29C 66/727; B29C 66/8161; B29C 66/81611; B29C 66/8227; B29C 66/83411; B29C 66/83413; B29C 66/8362; B29K 2105/04; B29L 2031/26; B29L 2031/265; B29L 2031/30; B60H 1/00507; B60H 1/00564; B60H 2001/00635
    See application file for complete search history.

(56) References Cited

U.S. PATENT DOCUMENTS

| | | | |
|---|---|---|---|
| 5,733,189 A | | 3/1998 | Eastwood |
| 5,795,421 A | * | 8/1998 | Takahashi .......... B29C 63/0039 156/108 |
| 6,589,110 B2 | | 7/2003 | Tanabe et al. |
| 7,562,912 B2 | | 7/2009 | Saenz et al. |
| 8,025,559 B2 | | 9/2011 | Schweitzer |
| 2013/0269854 A1 | * | 10/2013 | Cartabbia .......... B29C 65/5092 156/60 |
| 2014/0360675 A1 | | 12/2014 | Gonda et al. |

* cited by examiner

APPARATUS AND AN ASSEMBLY TO APPLY A FOAM SEAL TO A PART

RELATED APPLICATION

This application claims the benefit of Chinese Patent Application No.: CN 201610584095.5 filed on Jul. 22, 2016, the entire contents thereof being incorporated herein by reference.

TECHNICAL FIELD

This invention relates to an apparatus and an assembly to apply a foam seal on a part automatically.

BACKGROUND

There are many parts that need to be connected with a seal or a cushion component in a vehicle. For example, an air register may need to be sealed with a foam seal surrounding a peripheral of one end to realize sealed connection with an air duct. The process of applying the foam seal to the air register is usually performed manually.

US Patent US 20140360675 A1 discloses an automatic attaching apparatus of a foamed seal member. The automatic attaching apparatus of a foamed seal member includes an attaching hand handling a foamed seal member to press the foamed seal member on a flat surface of a work-piece to achieve an attachment. The apparatus comprises multiple devices such as pressing rollers and an air floating device and is structurally complicated, and not suitable for applying the seal member to small parts.

Therefore, it is desired to provide an apparatus for applying a seal to a part automatically to reduce production cost which is applicable for parts with irregular shape and providing robust connection.

BRIEF DESCRIPTION

According to one aspect of the present disclosure, an apparatus to apply a foam seal to a part, is provided. The apparatus includes a receiving device, a loading device and a driving device. The receiving device includes a housing to be connected with the part, a first rod at least partially disposed in the housing and a resilient member connected between the housing and the first rod at a radial direction. The loading device includes an actuation member to move the housing and a holding member to hold the foam seal. The driving device is configured to move the loading device between a loading position and an application position and further drive the actuation member and the holding member to rotate around an axis parallel to the first rod at the application position. At the application position, the actuation member contacts the housing while rotating and the foam seal on the holding member contacts the part.

In one embodiment, the resilient member may include four springs and one end of each spring is connected to the first rod and another end is connected to sidewalls of the housing.

In another embodiment, the receiving device may include a first plate connected to the housing, a second plate connected to the housing and a third plate connected to the first rod. The second plate has an opening to receive the first rod, and the third plate is positioned between the first plate and the second plate at a length direction of the first rod.

According to one aspect of the present disclosure, an apparatus applying a foam seal to a part is provided. The apparatus includes a receiving device, a loading device and a driving device. The receiving device includes a rotatable first rod, a housing connected to the first rod and moveable at a radial direction of the first rod, and the housing includes sidewalls substantially parallel to the first rod and is configured to detachably secure the part. The loading device includes a second rod substantially parallel to the first rod, an actuation member connected to the second rod and a holding member to hold the foam seal, connected to the second rod and spaced apart from the actuation member. The driving device moves the loading device between a loading position and an application position, and further drives the second rod to rotate. At the application position, the sidewalls of the housing contact the actuation member and the part contacts the foam seal held by the holding member.

In one embodiment, the housing may include a resilient member connected with the housing and the first rod. The resilient member may include four springs, and one end of each spring is connected to the first rod and another end is connected to the sidewalls of the housing.

In another embodiment, the receiving device may include a first plate connected to the housing, a second plate connected to the housing and a third plate connected to the first rod. The second plate may have an opening to receive the first rod and allow its movement, and the third plate is positioned between the first plate and the second plate at a lengthwise direction.

In another embodiment, one end of each spring is connected to the third plate and another end is connected to the sidewalls of the housing.

In another embodiment, the first plate and the second plate may be made from material including copper and the third plate may be made from material including steel.

In another embodiment, an external profile of the sidewalls of the housing may be configured to enable the foam seal contact the part along an external profile of the part when the actuation member drives the housing to rotate.

In an embodiment, the sidewalls of the housing may be configured to have a cross-sectional profile having the same shape as a cross-sectional profile of the part, and the actuation member and the holding member may be circular plates.

According to yet another aspect of the present disclosure, an assembly to apply a foam seal to a vehicle part is provided. The assembly comprises a main sidewall, a receiving device, a loading device, a driving device and a supply device preloaded with the foam seal. The receiving device includes a first rod rotatably connected to the main sidewall, and a housing connected to the first rod and moveable at a radial direction of the first rod, wherein the housing includes sidewalls substantially parallel to the first rod, and the vehicle part is detachably secured on the housing. The loading device includes a second rod substantially parallel to the first rod, an actuation member connected to the second rod and a holding member to hold the foam seal, connected to the second rod and spaced apart from the actuation member. The driving device is configured to move the loading device between a loading position and an application position and rotate the second rod. The supply device is configured to provide the foam seal to the holding member at the loading position. At the application position, the sidewalls of the housing contact the actuation member and the vehicle part contacts the holding member.

In one embodiment, the holding member of the loading device may include a first clamp and a second clamp to grip two ends of the foam seal, respectively.

In another embodiment, the supply device includes a foam seal roll and at least two rollers to deliver the foam seal to the loading position. The foam seal includes a plurality of foam seals having a preset length and disposed on an axial direction of the foam seal roll. The holding member of the loading device winds the foam seal with the preset length at the loading position.

In another embodiment, the assembly may further comprise an operation chamber and a supply chamber located under the operation chamber. The receiving device, the loading device, the driving device and the supply device are positioned at least partially at the operating chamber, and the foam seal roll is positioned at the supply chamber. The main sidewall is a sidewall of the operation chamber.

In another embodiment, the vehicle part is an air register.

According to still another aspect of the present disclosure, a method to apply a foam seal to a vehicle part via a foam seal application assembly is provided. The foam seal application assembly includes a supply device, a loading device, a receiving device, and a driving device to drive the loading device. The method comprises delivering a foam seal to the loading device at a loading position; rotating the loading device to be wound with the foam seal with a preset length; moving the loading device to an application position; and rotating the loading device to apply the foam seal to the vehicle part at an application.

In another embodiment, delivering the foam seal to the loading device includes delivering the foam seal to the loading device at the loading position from a foam seal roll via two rollers continually at a predetermined time. The foam seal roll may include a plurality of foam seals with the preset length, and each foam seal is positioned along an axial direction of the foam seal roll.

In another embodiment, the receiving device may include a rotable first rod, and a housing connected to the first rod and moveable along a radial direction of the first rod. The housing may include sidewalls substantially parallel to the first rod and configured to detachably secure the vehicle part. The loading device may include a second rod substantially parallel to the first road, an actuation member connected with the second rod and a holding member to hold the foam seal, connected to the second rod and spaced apart from the actuation member.

In another embodiment, applying the foam seal includes aligning the actuation member substantially to the housing and aligning the holding member substantially to the vehicle part. The movement of the housing relative to the first rod adjusts a position of the vehicle part to make it contact the holding member during rotation of the loading device.

In another embodiment, the vehicle part is an air register.

The apparatus and the assembly of the present disclosure automatedly apply a foam seal to an external profile of a part such as a vehicle part, and can realize a consistent attachment between the foam seal and the part even the external profile or the outer surface of the part has an irregular shape.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

One or more advantageous features as described herein will be readily apparent from the following detailed description of one or more embodiments when taken in connection with the accompanying drawings.

BRIEF DESCRIPTION OF THE DRAWINGS

For more complete understanding of one or more embodiments of the present invention, reference is now made to the one or more embodiments illustrated in greater detail in the accompanying drawings and described below.

DETAILED DESCRIPTION

As required, detailed embodiments of the present invention are only disclosed herein, however, it is to be understood that the disclosed embodiments are merely exemplary of the invention that may be embodied in various and alternative forms. The figures are not necessarily scaled; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
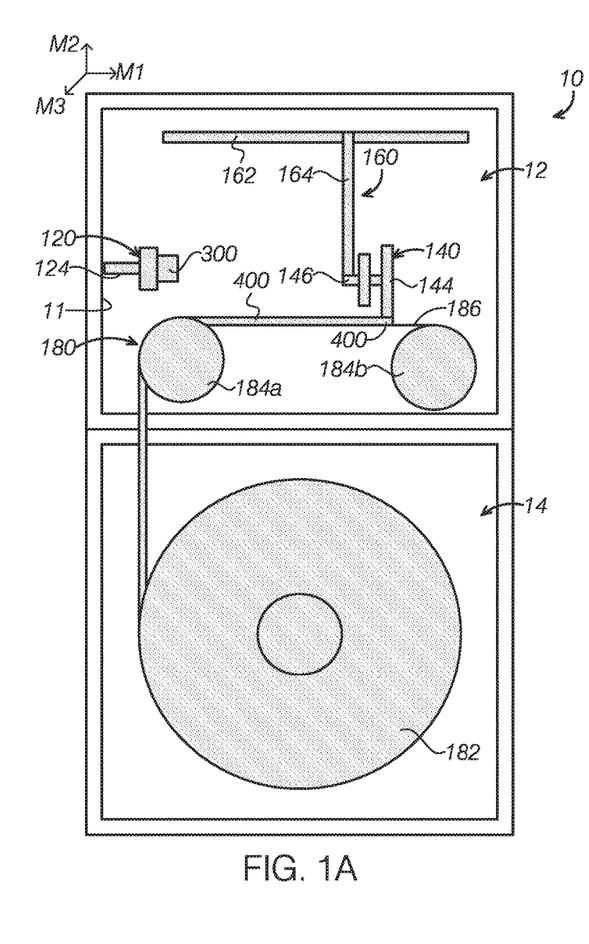
FIG. 1A is a schematic diagram of an assembly to apply a foam seal to a vehicle part according to one example embodiment of the present disclosure, illustrating a loading device at a loading position.
Figure 1B:
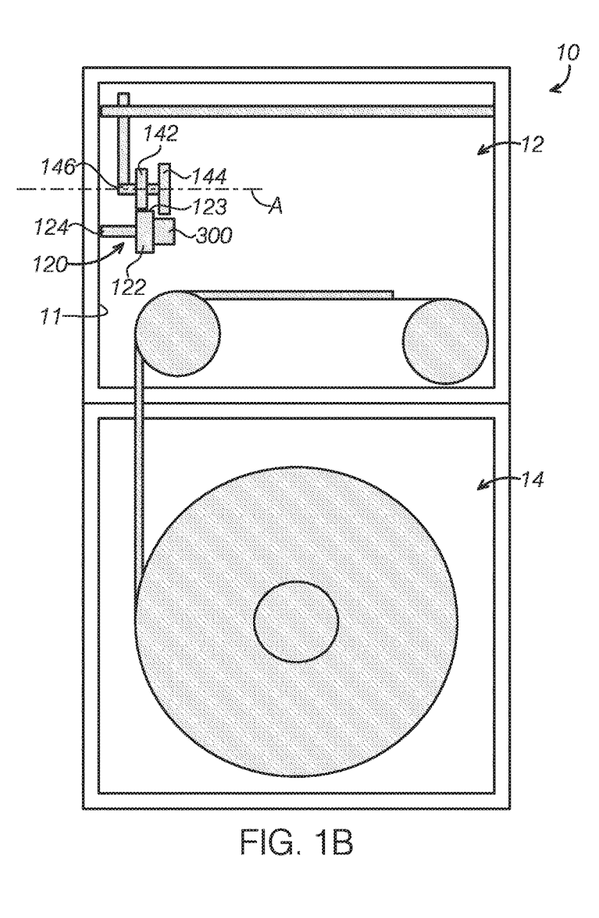
FIG. 1B is the schematic diagram of the assembly in FIG. 1A, illustrating the loading device at an application position.

In the specification, it should be understood that, the terms such as "central", "longitudinal", "lateral", "lengthwise", "widthwise", "thickness", "above", "below", "front", "rear", "right", "left", "vertical", "horizontal", "top", "bottom", "inner", "outer", "clockwise", "counter-clockwise" should be construed to refer to the orientation as described or as shown in the drawings. These terms are merely for convenience and concision of description and do not alone indicate or imply that the device or element referred to must have a particular orientation. Thus, it cannot be understood to limit the present disclosure FIGS. 1A to 1B schematically show an assembly 10 to apply a foam seal on a vehicle part according to one or more embodiments of the present disclosure. For purpose of the description, an air register is used as an example part on which the foam seal is applied. It should be appreciated that the assembly of the present disclosure can be used for other parts that need a seal or cushion, such as an air duct of an air conditioning system or a conduit for wirings. Further, the foam seal is used as an example seal material. The apparatus and assembly of the present disclosure is applicable to any seal material or strip having an adhesive surface.

FIGS. 1A to 1B show an assembly 10 to apply a foam seal 400 to a vehicle part 300 according to one or more embodiments of the present disclosure. The assembly 10 includes a receiving device 120 to secure the part 300, a loading device 140, a driving device 160, and a supply device 180 including prearranged foam seal 400.

In some embodiments, the assembly 10 may include an operation chamber 12 and a supply chamber 14 separated from the operation chamber 12. For example, the supply chamber 14 may be located under of the operation chamber 12. The receiving device 12, the loading device 140, and the driving device 160 may be positioned in the operation chamber 12. A sidewall of the operation chamber 12 may be configured as a main sidewall 11 to rotatably connect with a first rod 124 of the receiving device 120.

Figure 7:
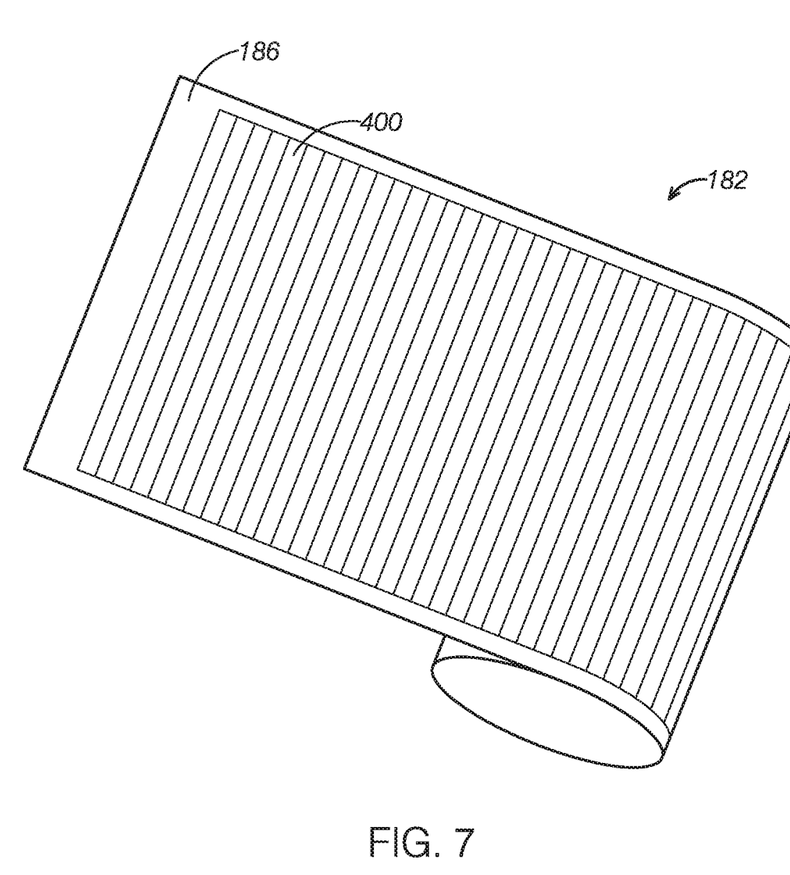
FIG. 7 illustrates an example foam seal roll used by an assembly to apply the foam seal.

At least a portion supply device 180 may be positioned in the supply chamber 14. Thus, a door (not showing) may be positioned at the supply chamber 14 for an operator to change a foam seal roll 182. The supply device 180 includes the foam seal roll 182 and at least two guiding wheels or rollers 184a, 184b. FIG. 7 schematically shows an embodiment of the foam seal roll 182. The foam seal roll 182 includes a release paper 186 and a plurality of foam seals 400 preset on the foam seal roll 186. The foam seals 400 with a preset length are disposed along with an axial of the foam seal roll 182. The length of foam seal 400 corresponds to a perimeter of the vehicle part 300 to be wound. An adhesives surface of the foam sea 400 is attached on the release paper 186. The foam seal 400 can be delivered to a position to contact the loading device 140 by moving the release paper via the rollers 184a, 184b. Continuing with FIG. 1A, a lengthwise direction of the foam seal 400 is parallel to a lengthwise direction of the rollers 184a, 184b. The rotation of a holding member 144 of the loading device 140 on the foam seal winds the foam seal 400 on the holding member 144 with an adhesive surface exposed outside. As described below, the holding member 144 of the loading device 140 includes a first clamper 144a and a second clamper 144b to grip two ends of the foam seal 400, respectively, so that the holding member 144 winds foam seal 400 with a preset length.

The driving device 160 moves the loading device 140 between the loading position shown in FIG. 1A, and the application position shown in FIG. 1B, and further drives the second rod 146 to rotate. At the loading position, the supplying device 180 delivers the foam seal 400 to the holding member 144 via the rollers and the loading device 140 is rotated to be wound with the foam seal 400. At the application position, the second rod 146 is parallel to a first rod 124, the sidewall 123 of the housing 122 touches the actuating member 142, and the vehicle part 300 touches the holding member 144. As known in the art, the driving device 160 may include a rail 162 and a connection rod 164 that is movable in multiple directions such as M1, M2, M3 relative to the rail 162. The connection rod 164 may be drivably connected with the second rod 146 via a rack and pinion to rotate the second rod. It should be appreciated that other connection between the connection rod 164 and the second rod 146, such as screw, gears, or a motor.

Figure 2:
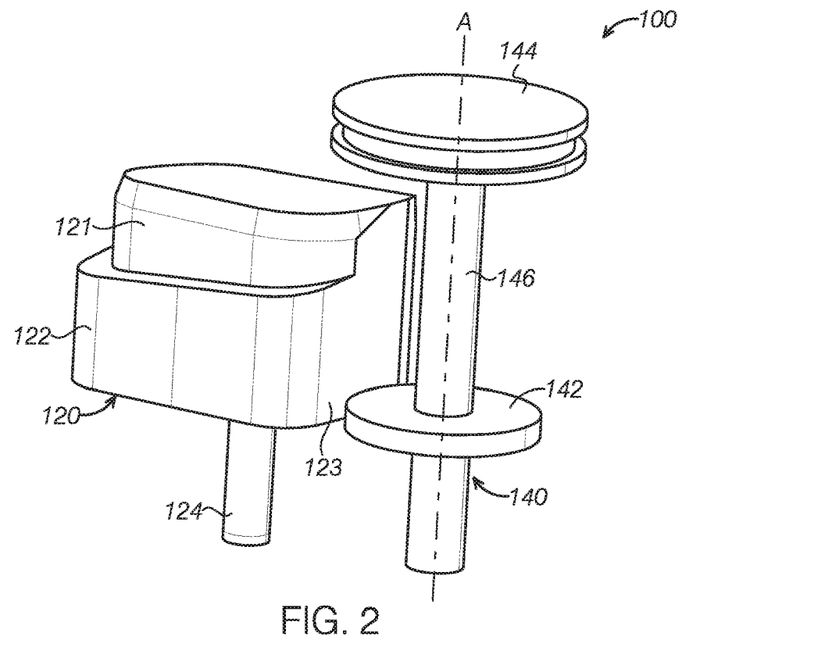
FIG. 2 is a perspective view of an apparatus to a foam seal to a part according to one or more embodiments of the present disclosure.
Figure 3:
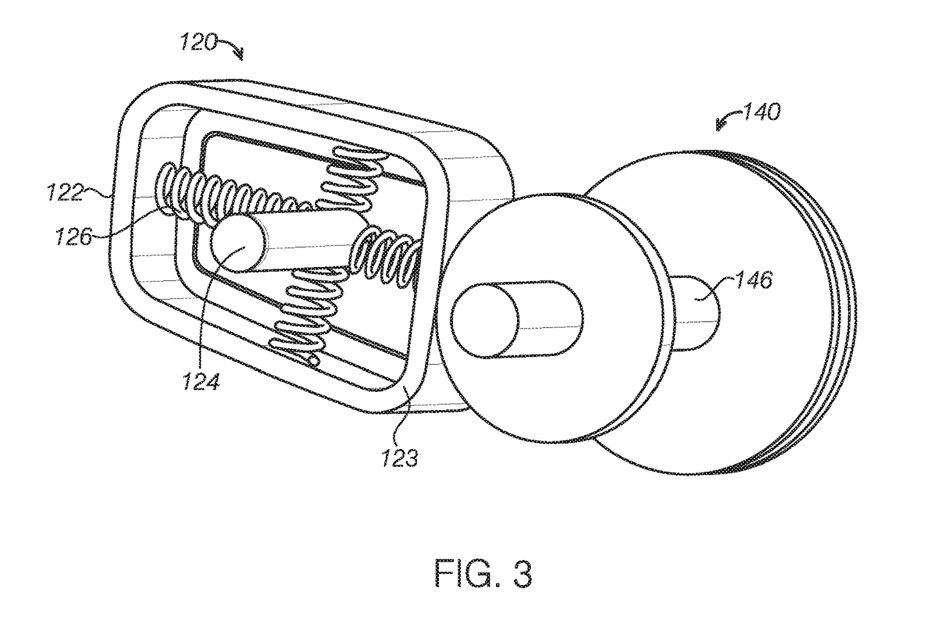
FIG. 3 is another view of the apparatus in FIG. 2.

FIGS. 2 to 5B schematically show an apparatus 100 to apply a foam seal 400 on a part 300 according to one embodiment of the present disclosure. Referring to FIGS. 2 to 5B and with further reference to FIGS. 1A-1B, the part 300 may be a vehicle part such as an air register. The apparatus 100 comprises a receiving device 120, a loading device 140, and a driving device 160. FIG. 2 is a perspective view of the apparatus 100 and FIG. 3 is a perspective view of apparatus 100 from another angle. The receiving device 120 includes a housing 122 and a connection portion 121 to secure the part 300. The housing 122 includes side walls 123 that partially defines a chamber. A rotatable first rod 124 is at least partially positioned in the chamber of the housing 122. In one embodiment, the first rod 124 extends parallelly along the sidewalls 123. Further, the housing 122 is movable relative to first rod 124 along a radial direction of the first rod 124. For example, as described herein elsewhere, the first rod 124 may be connected to the housing 122 by a resilient member 126 at a radial direction. The part 300 may be secured on the connection portion 121. For the simplicity of illustration, the part 300 is shown to slip over the connection part 121 to be connected. In other embodiments, the connection part 121 may detachable coupled with the part 300 via any appropriate approaches such as screw, buckle, clip connections.

The loading device 140 includes an actuating member 142 to move the housing 12 and a holding member 144 to grip the foam seal 400. At the loading position, the actuating member 142 touches the sidewall 123 of the housing 122 of the receiving device 120 and drives the housing 122 to rotate via a fraction force. Outer surfaces of the actuating member 142 and/or housing 122 may be configured to have a relative rough surfaces to produce a greater fraction to drive the housing 122. In some embodiments, the outer surfaces of the actuating member 142 and/or the housing 122 may consist of material with a greater coefficient of faction, such as leather. In one embodiment, the holding member 144 further includes a first clamper 144a and second clamper 144b to grip two ends of the foam seal as shown in FIG. 4A respectively, to wind the foam seal 400 with a preset length on the holding member 144.

Further, the loading device 140 may include a second rod 146. When the loading device 140 is located at the application position, the second rod 146 is substantially parallel to the first rod 124 of the receiving device 120. Both the actuating member 142 and holding member 144 may be connected to the second rod 146, and spaced apart along a lengthwise direction of the second rod 146. In such configuration, the actuating member 142 and the holding member 144 can be rotated synchronically with the second rod 146 and thus a separate driving device and a synchronizing device are not needed.

As described above, the apparatus 100 includes a driving device 160 which moves the device 140 between the loading position as shown in FIG. 1A, and the application position as shown in FIG. 1B, and further drives the actuating member 142 and the holding member 144 together to rotate with an axis A at the application position. In one embodiment, the second rod 146 extends along with the axis A substantially and parallel to the first rod 124, and the driving device 160 drives the second rod 146 to rotate.

Figure 4A:
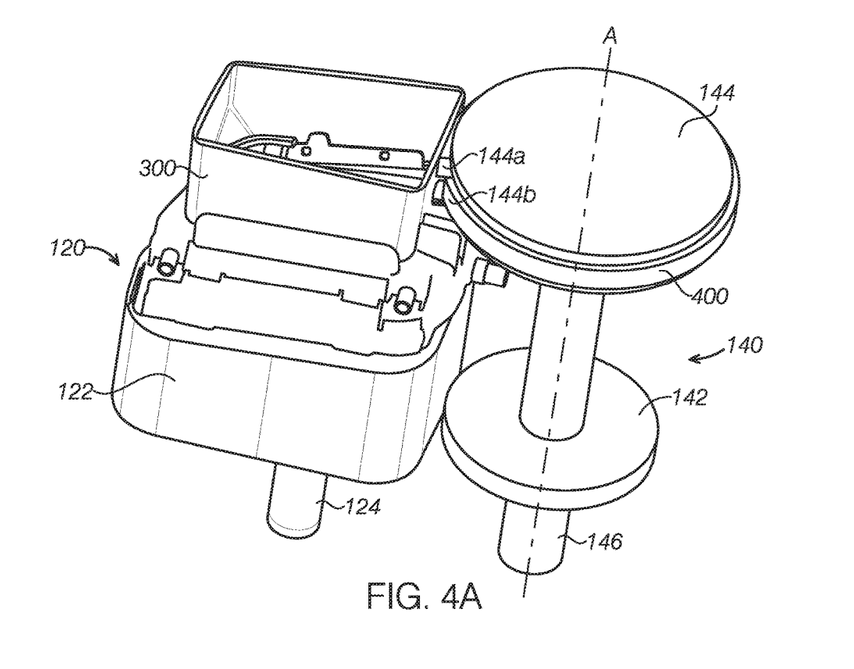
FIG. 4A is another view of the apparatus in FIG. 2, illustrating the foam seal and the part in an initial application position.
Figure 5A:
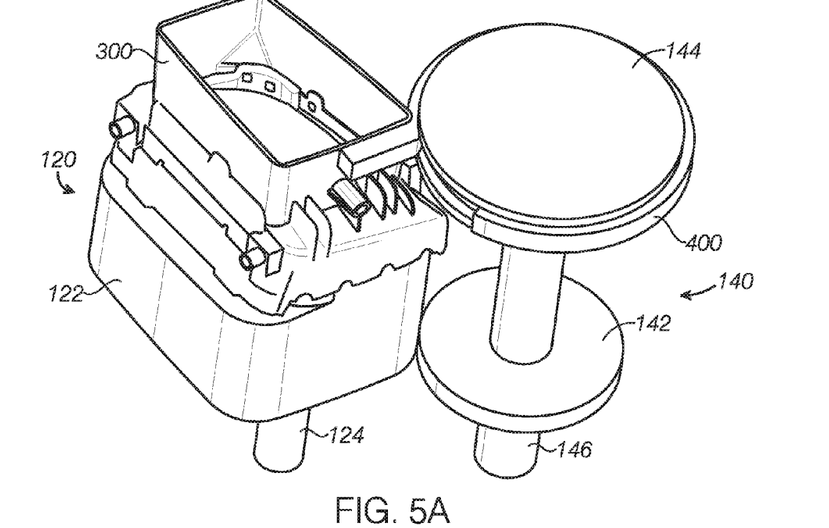
FIG. 5A is another view the apparatus in FIG. 4A, illustrating the part at another application position.

Referring to FIGS. 4A and 5A. FIGS. 4A and 5A illustrate the receiving device 120 with the part 300 and the loading device 140 with the foam seal 400 at an initial application position and another application position, respectively. At the application positions, a distance between the first rod 124 and the second rod 146 remains unchanged during a rotation of the housing 122. Since the part 300 may have an irregular shape or an irregular external profile, the distance between the holding member 144 and the part 300 needs to be adjusted automatically (such as to maintain unchanged distance) so as to apply the foam seal 400 to the part 300 with stable pressure. Thus, the housing 122 may be configured to translate relative to the first rod 124 along a radial direction of the first rod 124. As such, the part 300 secured on the housing 122 also moves relative to the first rod 124 to remain contact with the foam seal 400.

Figure 4B:
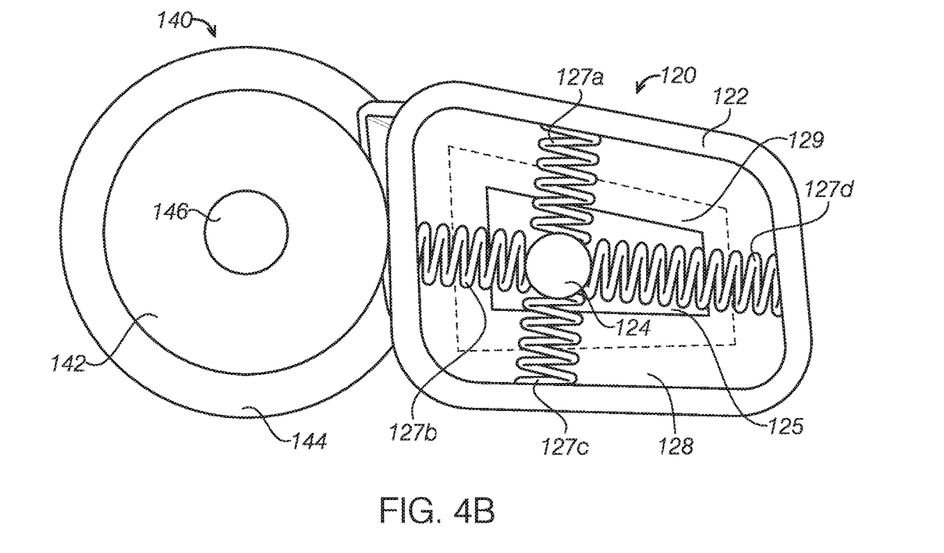
FIG. 4B is a plan view of the apparatus in FIG. 4A.
Figure 5B:
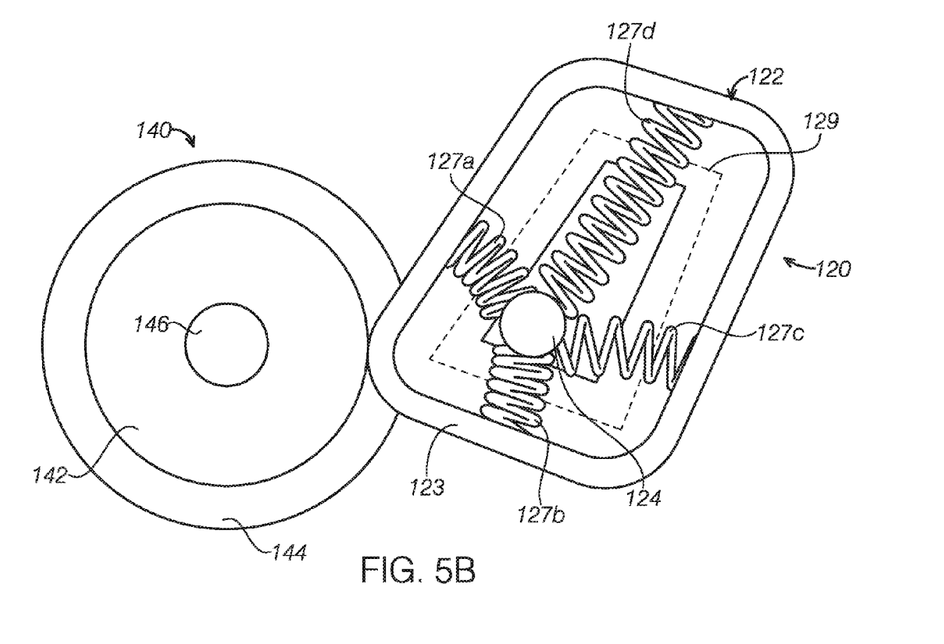
FIG. 5B is a plan view of the apparatus in FIG. 5A.

FIGS. 4B and 5B illustrates a cross-sectional view of the receiving device 120 and the loading device 140 at the initial application position and another application position, respectively. As shown in the FIGS. 4B and 5B, in one or more embodiments, the resilient member 126 is connected with the housing 122 and the first rod 124 at a radial direction of the first rod 124. The resilient member 126 may include four springs 127a. 127b, 127c, and 127d. One end of each of the springs 127a, 127b, 127c and 127d is connected with the first rod 124 and another end is connected to the sidewall 123 of the housing 122. Thus, the first rod 124 establishes an elastic connection with the housing 122 to realize a limited movement of the housing 122 relative to the first rod 124. For example, when the actuating member 140 rotates, the housing 122 may also rotate under a fraction force from the position shown in FIG. 4B to the position shown in FIG. 5B. Meaning while, the housing 122 translate relative to the first rod 124 to ensure the part 300 connected with the housing 122 to remain contact with the foam seal 400. The first rod 124 can rotate correspondingly under the force spring 127a, 127b, 127c and 127d. Because the first rod 124 is unmovable in the radial direction, the springs 127a and 127b are pressed and springs 127c and 127d are extended. Thus, the housing 122 is subject to a force biased to the actuating member 142 to contact with the actuating member 124. Thereafter, when the actuating member 142 rotates further, the housing 122 remains contact with the actuating member 142 under the spring forces from the four springs 127a. 127b, 127c and 127d and is actuated by the actuating member 142.

In addition, the external profile of the sidewall 123 of the housing 122 may be configured to make the foam seal 400 held by the holding member 144 to remain contact the part 300 along the outer surface of the part 300 when the housing 122 is rotated by the actuating member 142 so that the foam seal 400 is applied to the part 300 evenly. As shown in FIG. 4A, in one embodiment, the side wall 123 of the housing 122 may be configured to have a cross section with the same shape of the external profile as that of the cross section of the part 30. The actuating member 142 and the holding member 144 may be circular plates. Such configuration may coordinate the movements between the receiving device 120 and the loading device 140 easily.

Figure 4C:
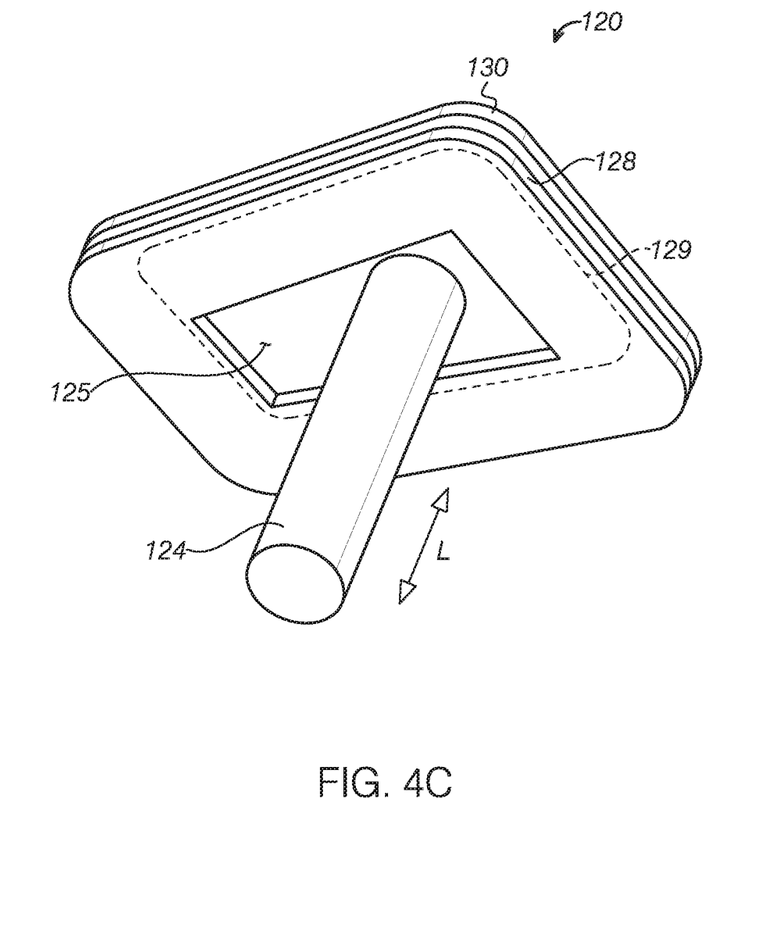
FIG. 4C is a schematic view of components of the apparatus in FIG. 4B.

FIG. 4C illustrates a schematic diagram of the first rod 124 of the receiving device 120 and other component in the housing 122. In one or more embodiments, the first rod 124 may be parallel the sidewall 123 of the housing 122 to provide a stable rotation. In addition, the receiving device 120 may further include a first plate 130 connected with the housing 122 and a second plate 128 to prevent undesired movement of the housing 122 relative to the first rod 124 at the axial direction. An opening 125 may be formed on the second plate 128 to allow the first rod 124 extends through the opening 125. Further, the open 125 is sized to be greater than a cross-sectional area of the first rod 124 so that the first rod 124 can move in the opening 125 along the radial direction of the first rod 124.

It should be appreciated that the opening 125 may be sized to allow the first rod 124 move freely in the opening 125 and not to touch the second plate 128 while the housing 122 is actuated to rotate. Referring to FIGS. 4B, 4C, and 5B, the dash line illustrates a third plate 129 connected with the first rod 124. The third plate 129 is disposed between the first plate 130 and the second plate 128 at a lengthwise direction L of the first rod 124. FIG. 4B schematically shows that the first rod 124 is located in a relative central position in the opening 125, and FIG. 5B schematically shows that the first rod 124 is located adjacent to an edge portion with the rotation of the housing 122 away from the initial application position. Further, the third plate 129 may be perpendicular to the first rod 124, and touches the first plate 130 and/or the second plate 128. As the first plate 130 and the second plate 128 limit the movement of the third plate 129 at an axial direction of the first rod 124, the movement of the housing 122 at the axial direction of the first rod 124 is prevented, and thus avoiding incorrect position of the foam seal 400 on the part 300. In some embodiments, lubrication may be provided between the first plate 130, the second plate 128, and the third plate 129 to facilitate the operation. In some embodiments, the first plate 130 and the second plate 128 may be made from material including copper and the third plate 129 may be made from material including steel to utilize different fraction coefficients between the materials.

Figure 6:
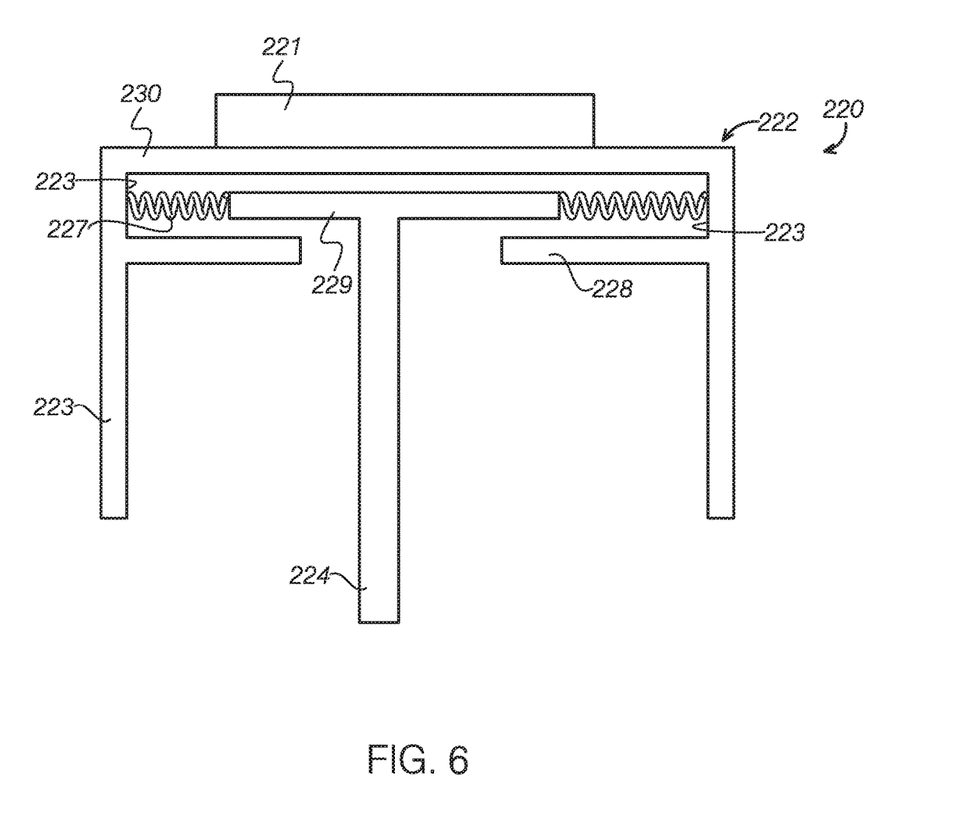
FIG. 6 is a cross-section side view of an apparatus to apply a foam seal to a part according to another embodiment of the present disclosure.

Referring to FIG. 6, FIG. 6 schematically illustrate a receiving device 220 of another embodiment of the present disclosure. For the sake of brevity, the same elements as those in FIG. 4A to 4C are not described in detail. A vehicle part (not shown) may be secured to the receiving device 220 via a connection portion 221. The receiving device 220 may include a first plate 230, a second plate 228, and a third plate 229. In the depicted embodiment, the first plate 230 may be formed integrally with sidewalls 223 of the housing 222 and formed as a top of the housing 222. Advantages of this structural include effective use of the space. Alternatively, the third plate 229 may be formed integrally with the first rod.

The third plate 229 may be connected to the housing 222 by springs 227. For example, one end of the spring 227 may be connected to the third plate 229 and another end of the spring 227 may be connected to the sidewalls 223, such that the first rod 224 is coupled to the housing 222 indirectly via the third plate 229. Advantages of this structural include providing a stable connection and further prevent a movement of the housing 222 at an axial direction of the first rod 224.

Figure 8:
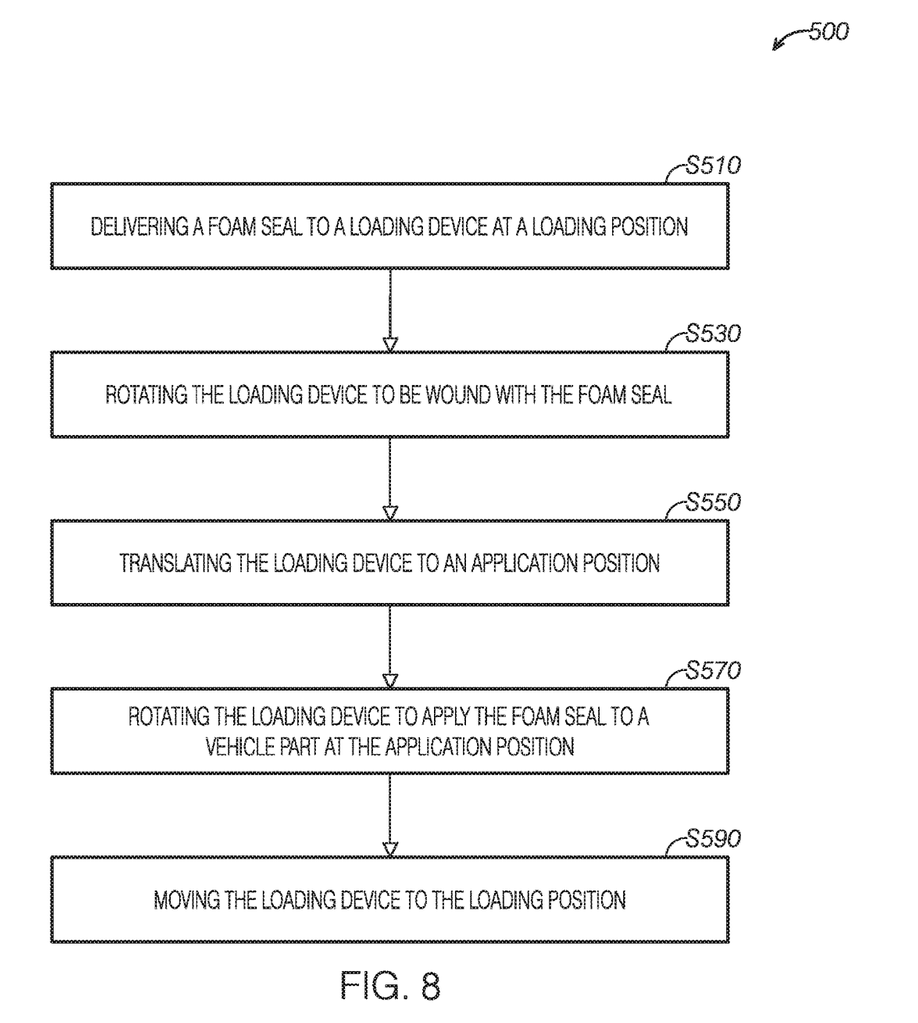
FIG. 8 is a flow chart of a method of applying foam seal to a vehicle part via a foam seal application assembly according to one embodiment of the present disclosure.

FIG. 8 is a flow chart of method 500 for applying a foam seal to a vehicle part via a foam seal application assembly such as the assembly 10 described above. The foam seal assembly may include a supply device, a loading device, a receiving device, and a driving device as described herein elsewhere.

Referring to FIG. 8 and with further reference to FIGS. 1A and 1B, at step S510, the method 500 may include delivering a foam seal 400 to a loading device 140 at a loading position. In one embodiment, a supplying device 180 may be used to deliver the foam seal 400 from a foam seal roll 182 using rollers 184a and 184b.

Next, at step S530, the method 500 may include rotating the loading device 140 to be wound with the foam seal 400. The loading device 140 may be driven by a driving device 160. In one embodiment as described above, the receiving device 120 includes the first rod 124 and the loading device 140 includes the second rod 146 parallel with the first rod 124, and an actuating member 142 connected with the second rod 146, and a holding member 144 connected with the second rod 146 and spaced apart from the actuating member 142. As shown in FIG. 7, the foam seal roll 182 includes a plurality of foam seals 400. Each foam seal has a preset length and is disposed along an axial direction of the foam seal roll 182. That is the lengthwise direction of the foam seal 400 parallels the axial direction of the foam seal roll 182. Thus, the rotation of the holding member 144 around the second rod 146 at the loading position can wind the foam seal 400 with the preset length from the foam seal roll 182. The holding member 144 of the loading device 140 may include a first clamper 144a and a second clamper 144b to grip two ends of the foam seal 400).

After the holding device 140 is rotated in one revolution, the holding member 144 can wind the foam seal 400 with the preset length, and an adhesive surface of the foam seal 400 faces outward when wrapped on the holding member 144.

Next, at step S550, the method may include translating the loading device 140 to an application position. The loading device 140 may be moved by the driving device 160 to the application position as shown in FIG. 1B.

Next, at step S570, the method may include rotating the loading device 140 to apply the foam seal 400 to the vehicle part 300. The loading device 140 may be rotated by the driving device 160. In some embodiments, referring to FIGS. 1B, 4A, and 5A, when the loading device 140 is positioned at loading position, the actuating member 142 may be aligned with the housing 122 of the receiving device 120, while the loading member 144 or the foam seal 400 held by the loading member may be aligned with the vehicle part 300 secured on the housing 122, to make the adhesive surface of the foam seal 400 contact the outer surface of the vehicle part 300. As described above, during the rotation of the loading device 140, the housing 122 moves relative to the first rod 124 at a radial direction automatically to ensure the contact of the foam seal 400 with the vehicle part 300 so that the foam seal is applied on the vehicle part 300.

Next, at step S590, the method may include moving the loading device to the loading position to repeat steps S510-570. Again, the loading device 140 is driven by the driving device 160.

The present application discloses an apparatus and the assembly to apply a foam seal to a part and a method to use the same. The foam seal can be applied to the part automatically and provide robust attachment of the foam seal to the part even the part has an irregular outer surface. One skilled in the art will readily recognize from such discussion, and from the accompanying drawings and claims that various changes, modifications and variations can be made therein without departing from the true spirit and fair scope of the invention as defined by the following claims.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An apparatus to apply a foam seal to a part, comprising:
a receiving device, wherein the receiving device includes a housing to secure the part, a first rod coupled to the housing and at least partially disposed in the housing and a resilient member connected between the housing and the first rod in a radial direction of the first rod;
a loading device, wherein the loading device includes an actuating member and a holding member to hold the foam seal; and
a driving device to move the loading device between a loading position and an application position and further drive the actuating member and the holding member to rotate around an axis,
wherein the axis is parallel to the first rod at the application position, the actuating member contacts the housing while rotating and a foam seal on the holding member contacts the part when the loading device is at the application position.

2. The apparatus of claim 1, wherein the housing includes sidewalls substantially parallel to the first rod and is configured to detachably secure the part and the housing is moveable in the radial direction of the first rod.

3. The apparatus of claim 2, wherein the resilient member includes four springs, and one end of each spring is connected to the first rod and another end of each spring is connected to a sidewall of the housing.

4. The apparatus of claim 2, wherein the loading device includes a second rod substantially parallel to the first rod, and the actuating member and the holding member are connected to the second rod and spaced apart from each other.

5. The apparatus of claim 4, wherein the receiving device includes a first plate connected to the housing, a second plate connected to the housing and a third plate connected to the first rod, the second plate has an opening to receive the first rod, and the third plate is positioned between the first plate and the second plate in a length direction.

6. The apparatus of claim 5, wherein the resilient member includes at least two springs, and one end of each spring is connected to the third plate and another end of each spring is connected to a sidewall of the housing.

7. The apparatus of claim 5, wherein the first plate and the second plate are made from material including copper and the third plate is made from material including steel.

8. The apparatus of claim 4, wherein an external profile of the sidewalls of the housing is configured to enable the foam seal to contact the part along an external profile of the part when the actuating member contacts the housing while rotating.

9. The apparatus of claim 8, wherein the sidewalls of the housing are configured to have a cross-sectional profile having the same shape as a shape of a cross-sectional profile of the part, and wherein the actuating member and the holding member are circular plates.

10. The apparatus of claim 4, wherein the loading device and the receiving device are configured such that the actuating member is substantially aligned with the housing and the holding member is substantially aligned with the part when the loading device is at the application position, and wherein movement of the housing relative to the first rod adjusts a position of the part to make it contact the foam seal on the holding member during rotation of the actuating member and the holding member.

11. An assembly to apply a foam seal to a vehicle part, comprising:
a main sidewall;
a receiving device, wherein the receiving device includes a first rod rotatably connected to the main sidewall, and a housing connected to the first rod and moveable in a radial direction of the first rod, wherein the housing includes sidewalls substantially parallel to the first rod, and the vehicle part is detachably secured on the housing;

a loading device, wherein the loading device includes a second rod substantially parallel to the first rod, an actuating member connected to the second rod and a holding member to hold the foam seal, connected to the second rod and spaced apart from the actuating member;

a driving device, wherein the driving device is configured to move the loading device between a loading position and an application position and rotate the second rod; and a supply device preloaded with the foam seal;

wherein the supply device is configured to provide the foam seal to the holding member when the loading device is at the loading position such that the foam seal is held on the holding member; and wherein the sidewalls of the housing contact the actuating member and the vehicle part contacts the foam seal held on the holding member when the loading device is at the application position.

12. The assembly of claim 11, wherein the holding member of the loading device includes a first clamp and a second clamp to grip two ends of the foam seal, respectively.

13. The assembly of claim 11, wherein the supply device includes a foam seal roll and at least two rollers, wherein the at least two rollers deliver the foam seal to the loading device when the loading device is in the loading position, wherein the foam seal having has a preset length and is disposed in an axial direction of the foam seal roll and wherein the holding member of the loading device winds the foam seal with the preset length onto the holding member when the loading device is at the loading position.

14. The assembly of claim 13, further comprising an operation chamber and a supply chamber located under the operation chamber, wherein the receiving device, the loading device, the driving device and the supply device are positioned at least partially in the operating chamber, and the foam seal roll is positioned in the supply chamber, and wherein the main sidewall is a sidewall of the operation chamber.

15. The assembly of claim 11, where the vehicle part is an air register.

16. A method to apply a foam seal to a vehicle part, the method comprising:

providing an apparatus, the apparatus comprising:
  a receiving device, wherein the receiving device includes a housing to secure the vehicle part, a first rod coupled to the housing and at least partially disposed in the housing and a resilient member connected between the housing and the first rod in a radial direction of the first rod;
  a loading device, wherein the loading device includes an actuating member and a holding member to hold the foam seal; and
  a driving device to move the loading device between a loading position and an application position and further drive the actuating member and the holding member to rotate around an axis,
  wherein the axis is parallel to the first rod at the application position, the actuating member contacts the housing while rotating and a foam seal on the holding member contacts the vehicle part when the loading device is at the application position;

providing the vehicle part on the housing of the receiving device;

delivering the foam seal to the holding member of the loading device while the loading device is at the loading position;

rotating the loading device with and winding the foam seal onto the holding member of the loading device such that the foam seal is held by the holding member, the foam seal having a preset length;

moving the loading device to the application position using the driving device; and rotating the loading device using the driving device to apply the foam seal to the vehicle part while the loading device is at the application position, the rotating of the loading device causing rotation of the actuating member and the holding member, wherein the actuating member contacts the housing while the actuating member is rotating and the foam seal on the holding member contacts the vehicle part while the holding member is rotating.

17. The method of claim 16, wherein delivering the foam seal to the holding member of the loading device further includes providing the foam seal from a foam seal roll using two rollers, wherein the foam seal roll includes a plurality of foam seals, each of the plurality of foam seals having the preset length, wherein each of the plurality of foam seals is positioned along an axial direction of the foam seal roll.

18. The method of claim 16, wherein the housing includes sidewalls substantially parallel to the first rod and configured to detachably secure the vehicle part; and wherein the loading device includes a second rod substantially parallel to the first rod, and the actuating member and the holding member are connected with the second rod and spaced apart from each other.

19. The method of claim 18, wherein moving the loading device to the application position includes aligning the actuating member substantially with the housing and aligning the holding member substantially with the vehicle part, and wherein the housing moves relative to the first rod in the radial direction of the first rod during the step of rotating the loading device to apply the foam seal to the vehicle part, wherein the movement of the housing in the radial direction of the first rod adjusts a position of the vehicle part to make it contact the foam seal held on the holding member.

20. The method of claim 16, wherein the vehicle part is an air register.

* * * * *